(12) United States Patent
Lambricht et al.

(10) Patent No.: US 10,377,660 B2
(45) Date of Patent: Aug. 13, 2019

(54) GLASS SHEET CAPABLE OF HAVING CONTROLLED WARPING THROUGH CHEMICAL STRENGTHENING

(71) Applicant: AGC GLASS EUROPE, Louvain-la-Neuve (BE)

(72) Inventors: Thomas Lambricht, Perwez (BE); Audrey Dogimont, Sart-Dames-Avelines (BE); Aline Degand, Bleret (BE); Florence Scheyvaerts, Brussels (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 15/577,870

(22) PCT Filed: May 19, 2016

(86) PCT No.: PCT/EP2016/061297
§ 371 (c)(1),
(2) Date: Nov. 29, 2017

(87) PCT Pub. No.: WO2016/198249
PCT Pub. Date: Dec. 15, 2016

(65) Prior Publication Data
US 2018/0162767 A1    Jun. 14, 2018

(30) Foreign Application Priority Data
Jun. 8, 2015 (EP) .................................. 15171016

(51) Int. Cl.
*C03C 3/087* (2006.01)
*C03C 21/00* (2006.01)
*C03C 23/00* (2006.01)

(52) U.S. Cl.
CPC .............. *C03C 3/087* (2013.01); *C03C 21/00* (2013.01); *C03C 21/002* (2013.01); *C03C 23/008* (2013.01)

(58) Field of Classification Search
CPC ...................................................... C03C 3/087
See application file for complete search history.

(56) References Cited

U.S. PATENT DOCUMENTS

| | | |
|---|---|---|
| 2010/0304949 A1 | 12/2010 | Sachot et al. |
| 2013/0160845 A1 | 6/2013 | Kuroiwa et al. |
| 2015/0072129 A1 | 3/2015 | Okahata et al. |
| 2016/0023945 A1 | 1/2016 | Suzuki et al. |
| 2016/0023946 A1* | 1/2016 | Hotta ................... C03C 3/087 428/220 |
| 2016/0083288 A1 | 3/2016 | Kase et al. |

FOREIGN PATENT DOCUMENTS

| | | | |
|---|---|---|---|
| WO | 2013/047806 A1 | 4/2013 | |
| WO | WO-2013047806 A1 * | 4/2013 | ............ C03C 3/087 |
| WO | WO-2013146438 A1 * | 10/2013 | ............ C03C 15/00 |
| WO | 2014/104302 A1 | 7/2014 | |
| WO | 2014/196407 A1 | 12/2014 | |

OTHER PUBLICATIONS

International Search Report dated Jul. 22, 2016 in PCT/EP2016/061297 filed May 19, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A float glass sheet having a boron- and lithium-free glass composition comprising the following in weight percentage, expressed with respect to the total weight of glass:
65≤SiO$_2$≤78%
5≤Na$_2$O≤20%
1≤K$_2$O<8%
1≤Al$_2$O$_3$<6%
2≤CaO<10%
0≤MgO≤8%;
K$_2$O/(K$_2$O+Na$_2$O) ratio which is from 0.1 to 0.7;
wherein the glass sheet has:

$$0.01 < \left| \frac{(Na_2O)_{air}}{(Na_2O)_{tin}} - 1.03 \right| \leq 3.$$

The glass sheet may be a chemically-temperable soda-silica type glass composition suitable for mass production that shows reduced or controlled increased warping effect.

19 Claims, 1 Drawing Sheet

GLASS SHEET CAPABLE OF HAVING CONTROLLED WARPING THROUGH CHEMICAL STRENGTHENING

1. FIELD OF THE INVENTION

The present invention relates to an improved glass sheet which is able to be chemically tempered/strengthened and capable of having controlled warping through chemical strengthening. For example, the present invention relates to a glass sheet capable of being inhibited from warping through chemical strengthening to keep its flatness, or alternatively, capable of being warped through chemical strengthening to a desired shape.

In particular, the present invention relates to an improved glass sheet which is able to be easily chemically tempered/strengthened, capable of having controlled warping through chemical strengthening, and which is inexpensive and easy to produce.

Chemically strengthened glass sheets are finding increasing applications in specialized glazing jobs where a mechanical resistance is required/mandatory, in a monolithic or laminated form, like transportation (i.e. aeronautical, automotive), building/architecture and display industries. Amongst such applications, the display industry has become in the several past years a huge market on demand for chemically strengthened transparent glass sheets as protective/cover glass, viewing window or (touch)screen for numerous electronic devices like mobile phones, smartphones, TV, computers, digital cameras, etc. Indeed, as many of these devices are portable, the glass used is mechanically solicited a lot and it is therefore highly desirable that it is able to tolerate impact and/or damage, such as scratches or impact, during use and transport. Chemical strengthening is even more of great importance in the domain of displays because such a domain requires glass sheets of low thickness (as low as less than 1 mm) and because chemical strengthening is known as the process of choice to mechanically reinforce (ultra-)thin glass sheets. For weight reasons, it is also advantageous to use thin glass sheets as cover glass for solar, thermal or photovoltaic device.

2. SOLUTIONS OF THE PRIOR ART

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. The rupture strength of a glass article which has been so treated is thus increased by a value approximately equal to the surface compressive stress generated.

Nevertheless, a damage capable of affecting the surface of a chemically strengthened glass during its use leads to a decrease in this strengthening effect and can even annihilate it if the damage is such that the layer under compression is penetrated. In consequence, depending on the use intended for the chemically strengthened glass, focus is made on achieving a high value of surface compressive stress (or "CS") and/or a high value of thickness of the layer under compression (which is associated with the parameter called the "depth of layer" or "DoL", namely the depth reached by the ions introduced) which is ideally at least equal to the depth of the largest possible defect/damage that the glass may undergo. The combination of these two parameters are generally considered to define appropriately the quality of the resulting mechanical strength.

In particular, in the display domain, when using a "piece-by-piece process" to produce chemically strengthened glass sheets (cutting to final size is carried out before tempering treatment), a high value of DoL (preferably higher than 10 microns and very preferably higher than 12 microns or even better higher than 15 microns) is searched for edge strength, while when using a "sheet process" (cutting to final size is carried out after tempering treatment), "central tension" (defined as (CS*DoL)/(glass thickness−2*DoL)) must be kept low.

It is also known that the two strengthening parameters also depend significantly, for a given glass composition, on the conditions of temperature and time of the ion exchange process. Thus, the thickness of the layer under compression increases with the temperature and with the duration of the ion-exchange according to the known diffusion laws. But the higher the temperature, the more rapidly the stresses induced by the ion exchange relax. Likewise, extending the treatment for a too long period allows giving the stresses the necessary time to relax and thus results in a less degree of toughening. The conditions to be chosen for the process therefore reside generally in a compromise between the optimum temperature and the minimum duration, to optimize process cost.

To lower the cost of the chemical strengthening (limiting duration and/or temperature to reach searched values of compressive stress and DOL), a lot of glass compositions which are "easy chemically temperable" (meaning that they especially favour ion exchange) have been proposed (merely described or already on the market) but they generally have various drawbacks.

Many of them comprise ingredients originating from expensive raw materials and/or considerably modifying the physical properties of the glass (molten or final). Some of the chemically temperable glass compositions known contain, for example, significant contents of lithium and/or boron. However, lithium has the disadvantage of increasing the density of the glass while boron has the disadvantage to cause sometimes formation of ream by its evaporation and furnace wall/refractories corrosion. Moreover, both have the additional and significant drawback to greatly increase final glass price, due to high price of their corresponding raw materials.

Aluminosilicate-type glass compositions, such as for example those described in US Patent Application US2012/0196110 A1, the GORILLA® glass product from Corning or the DragonTrail® glass product from Asahi Glass Co., are also known to be very efficient for chemical tempering. However, they have a lot of drawbacks. Their high temperature properties make them very difficult to produce (viscosity, fining ability, forming, refractories corrosion). Their cost is relatively high due to expensiveness of some raw materials to use (i.e. alumina) and due to the high temperatures required for their production (high content of energy/fuel).

Contrary to aluminosilicate glass compositions, soda-lime-silica glass compositions are generally not considered as good candidates for easy chemically temperable compositions, even if they are by far less expensive.

Finally, it is known that it is quite difficult to modify, even slightly, a glass composition, because:

a glass production line, and in particular a float line, represents considerable investment and it is not easily repairable if the composition causes, for example, damages to the refractories; and the transition time while changing from a composition to another is one parameter which is of high importance when producing glass, because if long, the production cost of the final glass is drastically negatively impacted.

Accordingly, there is a demand of the market in the display domain in particular for a chemically-temperable soda-lime-silica-type glass composition, which is more suited for mass production than aluminosilicate glass, and therefore is available at low cost, and with a base glass/matrix composition that is close to or very similar to compositions already used in existing mass production.

Next to that, float glass is widely used in general (and increasingly used in display industry) because of excellence in many respects such as flatness, smoothness and optical quality of surfaces and uniformity of thickness, and also its relatively low cost of production in comparison to glass sheets manufactured by other processes like, for example drawn glass.

Figure 1:
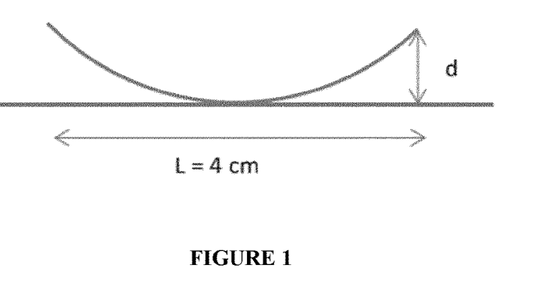
FIG. 1 is an illustration of warping of a glass sheet.

Unfortunately, when using float glass sheets with small thicknesses, as required by the display/electronic market, and applying a chemical strengthening by a classical ion-exchange process, a problem called "warping" of the strengthened final glass sheet occurs. This warping causes the glass sheet to deform or deviate from flatness and, in particular, warp is evaluated on the glass sheet after chemical strengthening as the ratio d/L, where d equals the distance or depth of variation, and L equals the distance or length over which the variation occurs, as illustrated in FIG. 1. For example, in the case of a float glass sheet of about 0.7 mm in thickness and a L length of 4 cm, the warping of the strengthened glass sheet reaches ~0.04% so that flatness is seriously compromised. However, in particular in the display domain, such a flatness is highly desirable for many reasons like, for example, to improve optical quality of glass sheets, to allow fitting to a display device assembly, to avoid/minimize optical distortion, or also to allow uniformly and effective depositing of a coating on the glass sheet (i.e. TCO coatings).

The main reason of warping of float glass during chemical strengthening comes from asymmetric faces of float glass from a chemical point of view and their different behaviour regarding ion-exchange. Indeed, float glass comprises a so-called "tin face" resulting from the diffusion of tin from the float bath into the lower glass face (in contact with the molten tin). The tin face of a float glass sheet is classically enriched in tin in the bulk of the glass near the extreme surface, according to a specific profile (i.e. diffusion profile or with a "hump") generally extending over a few microns. Commonly, the face opposite to the tin face is called the "air face". It has been recognized previously that the tin in the lower face of float glass exerts a blocking influence on the diffusion of ions (i.e. potassium ions) into the lower face of the float glass. Next to that, another difference between both faces of float glass is their availability in sodium ions. Sodium is the species that will be exchanged with potassium during chemical tempering. If there is different sodium availability between each face of float glass, the exchange rate will not be the same for each face. Usually, a chemically strengthened float glass sheet thus warps such that the upper surface (air face, opposite to the tin face) becomes convex.

The warpage of a float glass becomes large with an increase in the degree of behavior of chemical strengthening. Accordingly, in a chemically strengthened float glass having surface compressive stress of 600 MPa or more and a depth of a compressive stress layer (DOL) of 15 μm or more, which has been developed to respond to the requirement of high scratch resistance, the problem of warpage becomes obvious compared to a chemically strengthened float glass of the related art having surface compressive stress (CS) of about 500 MPa and a depth of a compressive stress layer (DOL) of about 10 μm.

Although it is also a clear market demand to use float (ultra-)thin glass sheets in the display domain, there are presently only a few proposed solutions allowing to avoid at least partially warping phenomenon in thin float glass, and these proposed solutions have huge drawbacks which limit their advantageous implementation at an industrial scale. One of the known and classical method/pre-treatment to avoid warping is to physically grind and then polish the lower face of float glass in order to eliminate the tin layer before implementing ion-exchange treatment. For example, such a pre-treatment is shown in Japanese patent application primary publication No. 58-115043 (1983). Anyway, main existing solutions to warping of thin float glass sheets involve:

a significant additional cost for the produced glass, and/or an off-line treatment, and/or a higher probability of defects and/or glass breakage, thereby resulting in a lower production yield (worsening glass final cost), and/or a loss of the excellent surface created on the surface of the molten tin bath.

In conclusion, there is a demand of the market in the display domain in particular for a chemically-temperable soda-lime-silica-type glass composition:

which is more suited for mass production than aluminosilicate glass, and therefore available at low cost, with a base glass/matrix composition that is close to or very similar to compositions already used in existing mass production, and with reduced or even no warping effect after toughening, while avoiding any additional off-line treatment like polishing or grinding treatment and thereby keeping excellent surface created on the surface of the molten tin bath.

3. OBJECTIVES OF THE INVENTION

The objective of the invention in particular is to remedy the cited disadvantages and resolving the technical problem, i.e. to provide a glass composition which is easy chemically temperable or, in other words, more favourable to ion exchange than conventional soda-lime-silica glass compositions, and which shows after toughening reduced warping (to keep flatness), or alternatively controlled increased warping (to a desired shape).

Another objective of the invention in at least one of its embodiments is to provide a glass composition which is easy chemically temperable and which allows reaching strengthening parameters appropriate for a "piece-by-piece" process used to produce cover glass for display devices (edge strength obtained typically by DoL>10-15 microns). In particular, an objective of the invention in such a context is to provide a glass composition which is easy chemically temperable and which allows obtaining great exchange depth, while keeping compressive stress values that result in a better reinforcement of glass.

Another objective of the invention in at least one of its embodiments is to provide a glass composition which is easy chemically temperable and easy to produce, in particular on an existing line of production of classical soda-lime-silica glass. In particular, an objective of the invention in such a context is to provide a glass composition which is easy chemically temperable and which does not require long transition time when passing from the production of the classical soda-lime-silica composition to the temperable composition (and vice-versa). Still in such a context, an objective of the invention is to provide a glass composition which is easy chemically temperable and which does not require to use raw materials, techniques and/or industrial installations which are different from those employed for classical soda-lime-silica glass ordinary produced (or, in other words, compatible with classical float process). More particularly, an objective of the invention in at least one of its embodiments is to provide a glass composition which is easy chemically temperable and with targeted properties (lower viscosity, lower working point temperature, melting point<1550-1500° C., sulfates fining ability, low refractories corrosion, appropriate devitrification temperature), thereby avoiding known drawbacks of alumino-silicate composition and making composition compatible with existing tools for production of soda-lime glass.

Finally, another objective of the invention is to provide a solution to the disadvantages to the prior art that is simple, quick and, above all, economical.

4. OUTLINE OF THE INVENTION

The invention relates to a float glass sheet having a boron- and lithium-free glass composition comprising the following in weight percentage, expressed with respect to the total weight of glass:

65≤$SiO_2$≤78%
5≤$Na_2O$≤20%
1≤$K_2O$<8%
1≤$Al_2O_3$<6%
2≤CaO<10%
0≤MgO≤8%;
a $K_2O/(K_2O+Na_2O)$ ratio of from 0.1 to 0.7;
the glass sheet having:

$$0.01 < \left|\frac{(Na_2O)_{air}}{(Na_2O)_{tin}} - 1.03\right| \leq 3$$

Hence, the invention rests on a novel and inventive approach, since it enables a solution to be found for the disadvantages of prior art.

The inventors have indeed found that it is possible to obtain an easy chemically temperable glass sheet which is unexpensive and easy to mass produce and limit high temperature induced stress relaxation by combining in a soda-silica glass matrix, a low alumina content (compared to classical alumina-silicate glass) and a combination of potassium and sodium ions in a ratio larger than in classical industrial glass compositions (including soda-lime-silica, the latter with typical values for that ratio below 0.1). Moreover, while combining such a base glass matrix with a specific ratio between $Na_2O$ amount in the air face and in the tin face, one can reach an easy chemically temperable glass sheet capable of having controlled warping through chemical strengthening (reduced warping to keep flatness or, alternatively, controlled increased warping to get a desired shape).

Throughout the present text, when a range is indicated, the extremities are included. In addition, all the integral and subdomain values in the numerical range are expressly included as if explicitly written. Also throughout the present text, the values of content as percentages are values by weight (also mentioned as wt %), expressed with respect to the total weight of the glass. Moreover, when a glass composition is given, this relates to the bulk composition of the glass, except if explicitly described in another way.

BRIEF DESCRIPTION OF THE DRAWINGS

A more complete appreciation of the invention and many of the attendant advantages thereof will be readily obtained by reference to the following detailed description when considered in connection with the accompanying drawings, wherein.

DETAILED DESCRIPTION

Other features and advantages of the invention will be made clearer from reading the following description of preferred embodiments given by way of simple illustrative and non-restrictive examples.

The glass sheet of the invention is made of a soda-silica glass composition/matrix, comprising $SiO_2$ and $Na_2O$ as the main components and further comprising MgO, $Al_2O_3$, etc and optionally CaO, $K_2O$ etc.

The glass sheet of the invention is able to be chemically tempered or, in other words, ion-exchangeable/able to undergo an ion-exchange, with reduced or even no warping effect or alternatively, with increased warping to design a shape.

The glass sheet of the invention is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking processes, in particular by the tin oxide content which may be measured, for example, by electronic microprobe to a depth of ~10 microns. In many cases and as illustration, this content lies between 1 and 5 wt %, integrated over the first 10 microns starting from the surface.

The float glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet).

The thickness of the float glass sheet is not particularly limited. In order to effectively perform chemical strengthening treatment described below, the thickness of the glass sheet is usually preferably 5 mm or less, more preferably 3 mm or less, more preferably 1.5 mm or less, and particularly preferably 0.8 mm or less (for example, less than 0.7 mm or less than 0.55 mm or even less than 0.35 mm). The problem of warpage after chemical strengthening is likely to occur when the thickness of the glass sheet is less than 3 mm, and typically, less than 1.5 mm.

According to the present invention, the float glass sheet has:

$$0.01 < \left| \frac{(Na_2O)_{air}}{(Na_2O)_{tin}} - 1.03 \right| \leq 3$$

The value of 1.03 subtracted from the ratio $$\frac{(Na_2O)_{air}}{(Na_2O)_{tin}}$$

allows eliminating contribution from reference (glass sheet not treated for warpage control). The defined term in absolute value allows covering both decrease of warpage or controlled increase of warpage.

To obtain the specific $Na_2O$ ratio between air and tin faces in the glass sheet of the invention, a dealkalization treatment is implemented, and the difference between the degree of dealkalization between that in one face thereof and that in the other face thereof is set to be within a specific range. As a result, it is possible to control the exchange rate of ions in a face versus the opposite one, and it is possible to achieve a balance in the degree of behaviour of chemical strengthening between one face and the other one. For this reason, in the glass sheet of the invention, it is possible to control the warpage (reduce/avoid the warpage or alternatively increase the warpage) of the strengthened glass sheet, without conducting grinding or polishing treatment before strengthening.

The amount of $Na_2O$ in the air face, namely "$(Na_2O)_{air}$", means the $Na_2O$ amount in the bulk of the glass near the extreme surface of the air face. The amount of $Na_2O$ in the tin face, namely "$(Na_2O)_{tin}$", means the $Na_2O$ amount in the bulk of the glass near the extreme surface of the tin face. According to the invention, the $Na_2O$ amount on each face (tin or air) is measured by an X-ray fluorescence (XRF) spectrometer using Na—Kα rays. In present text, the amount of $Na_2O$ was determined by using a calibration curve method build with International glass reference samples. As the measurement apparatus, S4 Explorer manufactured by Bruker is exemplified with following measurement parameters:

Output: Rh 30 kV-100 mA
Filter: No
Mask: 34 mm
Colimator: 0.46
Analyzing crystal: XS55
Detector: FC
Element Rays: Na—Kα
Peak angle (2θ/deg.): 25,017
Peak measurement time period (seconds): 30
B. G. 1 (2θ/deg.): NA
B. G. 1 measurement time period (seconds): 0
B. G. 2 (2θ/deg.): NA
B. G. 2 measurement time period (seconds): 0
PHA FC: 37-174.

If the float glass sheet according to the invention is covered by a coating or a layer, the amount of $Na_2O$ is determined while excluding the coating/layer itself, taking into account the glass only.

Preferably, the float glass sheet has:

$$0.03 < \left| \frac{(Na_2O)_{air}}{(Na_2O)_{tin}} - 1.03 \right| \leq 1.5$$

More preferably, the float glass sheet has:

$$0.05 < \left| \frac{(Na_2O)_{air}}{(Na_2O)_{tin}} - 1.03 \right| \leq 1.2$$

Even more preferably, the float glass sheet has:

$$0.1 < \left| \frac{(Na_2O)_{air}}{(Na_2O)_{tin}} - 1.03 \right| \leq 0.9$$

In a very preferred manner, the float glass sheet has:

$$0.2 < \left| \frac{(Na_2O)_{air}}{(Na_2O)_{tin}} - 1.03 \right| \leq 0.45$$

According to a preferred embodiment of the invention, the float glass sheet has:

$$\frac{(Na_2O)_{air}}{(Na_2O)_{tin}} \leq 1.01.$$

According to this embodiment, preferably, the float glass sheet has:

$$\frac{(Na_2O)_{air}}{(Na_2O)_{tin}} \leq 1.$$

More preferably, the float glass sheet has:

$$\frac{(Na_2O)_{air}}{(Na_2O)_{tin}} \leq 0.99 \text{ or even } \frac{(Na_2O)_{air}}{(Na_2O)_{tin}} \leq 0.97.$$

The most preferably, the float glass sheet has:

$$\frac{(Na_2O)_{air}}{(Na_2O)_{tin}} \leq 0.95 \text{ or even, } \frac{(Na_2O)_{air}}{(Na_2O)_{tin}} \leq 0.93.$$

Such embodiments are advantageous as they allow decreasing more and more warpage through chemical strengthening and thereby keeping as much as possible flatness of the glass sheet. Some can also lead to negative warpage (or antiwarpage), which is desirable in some applications.

According to the invention, the composition of the float glass sheet is boron-free. This means that boron is not intentionally added in the glass batch/raw materials and that, if it is present, $B_2O_3$ content in the composition of the glass sheet reaches only level of an impurity unavoidably included in the production. For example, $B_2O_3$ content in the composition of the float glass sheet of the invention is less than 0.01 or even better less than 0.005 wt %.

According to the invention, the composition of the float glass sheet is lithium-free. This means that lithium is not intentionally added in the glass batch/raw materials and that, if it is present, $Li_2O$ content in the composition of the glass sheet reaches only level of an impurity unavoidably included in the production. For example, $Li_2O$ content in the composition of the float glass sheet of the invention is less than 0.01 wt % or even better less than 0.005 wt %.

According to the invention, the composition of the float glass sheet comprises: $1 \leq Al_2O_3 < 6$ wt %. Preferably, the composition of the float glass sheet comprises: $1 \leq Al_2O_3 < 5$ wt % or even: $1 \leq Al_2O_3 < 4$ wt %. More preferably, the composition of the float glass sheet comprises: $1 \leq Al_2O_3 \leq 3$ wt %. Alternatively, the composition of the float glass sheet comprises: $2 < Al_2O_3 < 6$ wt %. Preferably, the composition of the float glass sheet comprises: $2 < Al_2O_3 < 5$ wt % or even: $2 < Al_2O_3 < 4$ wt %. More preferably, the composition of the float glass sheet comprises: $2 < Al_2O_3 \leq 3$ wt %. Advantageously and alternatively also, $3 \leq Al_2O_3 < 6$ wt %. Preferably, the composition of the float glass sheet comprises: $3 \leq Al_2O_3 < 5$ wt % or even: $3 \leq Al_2O_3 < 4$ wt %. Alternatively, the composition of the float glass sheet comprises: $4 \leq Al_2O_3 < 6$ wt % or even $4 \leq Al_2O_3 < 5$ wt %.

According to the invention, the composition of the glass sheet comprises: $2 \leq CaO < 10$ wt %. Preferably, the composition of the glass sheet comprises: $3 \leq CaO < 10$ wt % and more preferably, $4 \leq CaO < 10$ wt %. In a very particularly preferred embodiment, the composition of the glass sheet comprises: $5 \leq CaO < 10$ wt %. In the most preferred embodiment, the composition of the glass sheet comprises: $6 \leq CaO < 10$ wt %.

According to the invention, the composition of the glass sheet comprises: $0 \leq MgO \leq 8$ wt %. Preferably, the composition of the glass sheet comprises: $0 \leq MgO \leq 7$ wt % and more preferably, $0 \leq MgO \leq 6$ wt %. In the most preferred embodiment, the composition of the glass sheet comprises: $0 \leq MgO < 5$ wt %.

According to the invention, the composition of the glass sheet comprises: $1 \leq K_2O < 8$ wt %. Preferably, the composition of the glass sheet comprises: $1 \leq K_2O < 7$ wt % and more preferably, $1 \leq K_2O < 6$ wt %. In a very particularly preferred embodiment, the composition of the glass sheet comprises: $1 \leq K_2O < 5$ wt %. Alternatively, the composition of the glass sheet comprises: $2 \leq K_2O \leq 6$ wt %, or even better $3 \leq K_2O \leq 6$ wt %. In the most preferred embodiment, the composition of the glass sheet comprises: $2 \leq K_2O \leq 4$ wt %.

According to the invention, the composition of the glass sheet comprises a $K_2O/(K_2O+Na_2O)$ ratio of from 0.1 to 0.7. Preferably, the composition of the glass sheet comprises a $K_2O/(K_2O+Na_2O)$ ratio of from 0.1 to 0.6. More preferably, the composition of the glass sheet comprises a $K_2O/(K_2O+Na_2O)$ ratio of from 0.2 to 0.6. Alternatively, the composition of the glass sheet comprises a $K_2O/(K_2O+Na_2O)$ ratio of from 0.1 to 0.5 In a very particularly preferred embodiment, the composition of the glass sheet comprises a $K_2O/(K_2O+Na_2O)$ ratio of from 0.2 to 0.5. In a most preferred embodiment of the invention, the composition comprises a $K_2O/(K_2O+Na_2O)$ ratio of from 0.2 to 0.4.

According to an embodiment of the invention, the composition comprises total iron (expressed in the form of $Fe_2O_3$) in a content ranging from 0.002 to 1.7% by weight. Preferably, the composition of the invention comprises a total iron (expressed in terms of $Fe_2O_3$) content ranging from 0.002 to 0.6 wt % and, more preferably, ranging from 0.002 to 0.2 wt %.

In a very preferred embodiment, the composition of the invention comprises a total iron (expressed in terms of $Fe_2O_3$) content ranging from 0.002 to 0.06 wt %. A total iron (expressed in the form of $Fe_2O_3$) content of less than or equal to 0.06 wt % makes it possible to obtain a glass sheet with almost no visible coloration and allowing a high degree of flexibility in aesthetic designs (for example, getting no color variation when white silk printing of some glass elements of smartphones). The minimum value makes it possible not to be excessively damaging to the cost of the glass as such, low iron values often require expensive, very pure, raw materials and also purification of these. Preferably, the composition comprises a total iron (expressed in the form of $Fe_2O_3$) content ranging from 0.002 to 0.04 wt %. More preferably, the composition comprises a total iron (expressed in the form of $Fe_2O_3$) content ranging from 0.002 to 0.02 wt %. In the most preferred embodiment, the composition comprises a total iron (expressed in the form of $Fe_2O_3$) content ranging from 0.002 to 0.015 wt %.

Alternatively, the composition may comprise total iron as follows: $0.06 < Fe_2O_3 \leq 1.7\%$ by weight. More preferably, the composition may comprise total iron as follows: $0.06 < Fe_2O_3 \leq 0.6\%$ by weight, and the most preferably, $0.06 < Fe_2O_3 \leq 0.2\%$ by weight.

According to a particularly preferred embodiment, the composition of the float glass sheet of the invention comprises the following in weight percentage, expressed with respect to the total weight of glass:

$65 \leq SiO_2 \leq 78\%$
$8 \leq Na_2O \leq 15\%$
$1 \leq K_2O < 6\%$
$1 \leq Al_2O_3 < 3\%$
$4 \leq CaO < 10\%$
$0 \leq MgO \leq 6\%$;
a $K_2O/(K_2O+Na_2O)$ ratio which is ranging from 0.1 to 0.5.

According to this last embodiment, the composition of the float glass sheet of the invention more preferably comprises:

$65 \leq SiO_2 \leq 78\%$
$8 \leq Na_2O \leq 15\%$
$2 \leq K_2O < 6\%$
$1 \leq Al_2O_3 < 3\%$
$6 \leq CaO < 10\%$
$0 \leq MgO \leq 6\%$;
a $K_2O/(K_2O+Na_2O)$ ratio which is ranging from 0.2 to 0.5.

According to another preferred embodiment, the composition of the float glass sheet of the invention more preferably comprises:

$65 \leq SiO_2 \leq 78\%$
$8 \leq Na_2O \leq 15\%$
$2 \leq K_2O < 4\%$
$1 \leq Al_2O_3 < 3\%$
$6 \leq CaO < 10\%$
$0 \leq MgO \leq 5\%$;
a $K_2O/(K_2O+Na_2O)$ ratio which is ranging from 0.2 to 0.4.

According to another embodiment, the composition of the float glass sheet comprises ZnO in a content lower than 0.1 wt % Preferably, the composition of the glass sheet is free of ZnO. This means that the element zinc is not intentionally added in the glass batch/raw materials and that, if it is present, ZnO content in the composition of the glass sheet reaches only level of an impurity unavoidably included in the production.

According to another embodiment, the composition of the float glass sheet comprises $ZrO_2$ in a content lower than 0.1 wt %. Preferably, the composition of the glass sheet is free of $ZrO_2$. This means that the element zirconium is not intentionally added in the glass batch/raw materials and that, if it is present, $ZrO_2$ content in the composition of the glass sheet reaches only level of an impurity unavoidably included in the production.

According to still another embodiment, the composition of the float glass sheet comprises BaO in a content lower than 0.1 wt %. Preferably, the composition of the glass sheet is free of BaO. This means that the element barium is not intentionally added in the glass batch/raw materials and that, if it is present, BaO content in the composition of the glass sheet reaches only level of an impurity unavoidably included in the production.

According to still another embodiment, the composition of the float glass sheet comprises SrO in a content lower than 0.1 wt %. Preferably, the composition of the glass sheet is free of SrO. This means that the element strontium is not intentionally added in the glass batch/raw materials and that, if it is present, SrO content in the composition of the glass sheet reaches only level of an impurity unavoidably included in the production.

According to still another embodiment, the composition of the float glass sheet comprises bulk $SnO_2$ in a content lower than 0.1 wt % (bulk content excluding $SnO_2$ in the "tin face" of a float glass sheet). Preferably, the composition of the glass sheet is free of bulk $SnO_2$. This means that the element tin is not intentionally added in the glass batch/raw materials and that, if it is present, bulk $SnO_2$ content in the composition of the glass sheet reaches only level of an impurity unavoidably included in the production.

According to an embodiment of the invention, the composition comprises coloring components other than iron, chromium and cobalt oxides in a total content which is less than 0.005 wt %. Such an embodiment allows to control color and thus to provide a glass sheet which is neutral as mainly requested for display applications. More preferably, the composition of the invention comprises coloring components other than iron, chromium and cobalt oxides in a total content which is less than 0.003 wt %.

Advantageously, the composition of the invention may further comprise chromium and/or cobalt oxides in a total content which is between 0.001 and 0.025 wt %. This means that the composition may comprise only chromium, only cobalt or both. Such a specific composition makes the glass especially suitable for touch technology based on IR transmission.

According to one embodiment of the invention, the float glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the float glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the float glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the float glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching producing a specific roughness of the treated face of the glass sheet.

According to the applications and/or properties desired, other layer(s)/treatment(s) can be deposited/done on one and/or the other face of the float glass sheet according to the invention.

The glass sheet of the invention is obtained by a float method. In the float method, a glass sheet is manufactured using a melting furnace in which a raw material of glass is melted, a float bath in which molten glass is floated on a molten metal (tin) to form a glass ribbon, and an annealing furnace in which the glass ribbon is annealed. Hereinafter, in the method description, the term "glass sheet" may be used as a generic term indicating the glass sheet and/or the glass ribbon.

In an exemplified method of preparing the float glass sheet of the invention, at least the air face of the glass sheet (or glass ribbon) is subjected to a dealkalization treatment, thereby removing alkaline components, and thus, reaching the specific ratio according to the invention. For example, the dealkalization method may advantageously be a method of treating the glass with a substance capable of ion exchange reaction(s) with alkaline components in the glass. As a substance capable of ion exchange reaction(s) with alkaline components in the glass, examples include molecules having fluorine atoms in the structure thereof, sulphur-based compounds, acid, or nitride. The substance capable of ion exchange reaction(s) with alkaline components in the glass may be for example in the form of gas, liquid, . . . or any other suitable form (available form(s) depend(s) amongst others of the substance itself).

Examples of substance containing molecules having fluorine atoms in the structure thereof include hydrogen fluoride (HF), freon (for example, chlorofluorocarbon, fluorocarbon, hydrochlorofluorocarbon, hydrofluorocarbon, halon and the like), hydrofluoric acid, fluorine (simple substance), trifluoroacetic acid, carbon tetrafluoride, silicon tetrafluoride, phosphorus pentafluoride, phosphorus trifluoride, boron trifluoride, nitrogen trifluoride, chlorine trifluoride, and the like.

Examples of sulphur-based compounds include sulfurous acid, sulfuric acid, peroxomonosulfuric acid, thiosulfuric acid, dithionous acid, disulfuric acid, peroxodisulfuric acid, polythionic acid, hydrogen sulfide, sulfur dioxide, and the like.

Examples of an acid include hydrochloric acid, carbonic acid, boric acid, lactic acid, and the like.

Examples of a nitride include nitric acid, nitric monoxide, nitrogen dioxide, nitrous oxide, and the like.

The method for application of the substance capable of ion exchange reaction(s) with alkaline components in the glass may be chosen depending on the form of the substance and any other suitable and desired parameter.

In the float process in which glass is formed on a molten metal (tin) bath, the substance capable of ion exchange reaction(s) with alkaline components in the glass may be supplied to the glass sheet being conveyed on the molten metal bath from the side not in contact with the metal surface, thereby treating the top face of the glass sheet/ ribbon (air face). In the annealing zone subsequent to the molten metal (tin) bath, the glass sheet is conveyed by roller conveying. Here, the annealing zone includes not only the inside of the annealing furnace but also a portion where the glass sheet is conveyed from the molten metal bath to the annealing furnace in the float bath. In the annealing zone, the substance capable of ion exchange reaction(s) with alkaline components in the glass may be supplied from the face that was not in contact with the molten metal (air face) and/or the opposite face (tin face).

The invention also relates to the use of the chemically tempered float glass sheet according to the invention in an electronic device.

EXAMPLES

Powder raw materials were mixed together and placed in melting crucibles, according to the compositions specified in the following tables 1-4. The raw material mix was then heated up in an electrical furnace to a temperature allowing complete melting of the raw material.

In a first series (examples 1.x), the base molar composition was kept constant, and the proportion between $Na_2O$ and $K_2O$ was varied in the range of the invention while keeping constant the molar fraction of alkali ($Na_2O+K_2O$~13.3 mol %) over the total composition. Example 1.1 is a comparative example, similar to state-of-the-art soda-lime float glass composition, with a classical $K_2O/(K_2O+Na_2O)$ ratio.

In a second series (examples 2.x.x), the molar composition in $SiO_2$ and $Al_2O_3$ was kept constant. The molar fraction of total alkali ($Na_2O+K_2O$~13.3 mol %) and total alkali-earth ($MgO+CaO$~15 mol %) were as well kept constant, but the proportion between $K_2O$ and $Na_2O$ and between $MgO$ and $CaO$ were varied. As replacement of CaO by MgO is known to improve DoL, 3 levels of CaO/MgO (sub-series 2.1.x, 2.2.x and 2.3.x) were tested to show the beneficial impact of an improved $K_2O/(K_2O+Na_2O)$ ratio over a large range of compositions. Examples 2.1.1, 2.2.1, 2.3.1 are comparative examples, for each sub-series, with a classical $K_2O/(K_2O+Na_2O)$ ratio.

The third series (examples 3.x) is similar to the series 2.2.x, but with a higher content of $Al_2O_3$. Example 3.1 is a comparative example, with a classical $K_2O/(K_2O+Na_2O)$.

In a fourth series (examples 4.x), the base molar composition was kept constant, and the proportion between $Na_2O$ and $K_2O$ was varied in the range of the invention while keeping constant the molar fraction of alkali ($Na_2O+K_2O$~13.3 mol %) over the total composition. Two glass tints were prepared, characterized by their levels of iron: ~0.2% wt % of $Fe_2O_3$ (~light green glass), and ~0.45 wt % of $Fe_2O_3$ (~green glass). In this series, examples 4.1 and 4.4 are comparative examples, similar to state of the art float compositions, with a classical $K_2O/(K_2O+Na_2O)$ ratio.

TABLE 1

| Wt % | EX1.1 (comp) | EX1.2 | EX 1.3 | EX 1.4 |
|---|---|---|---|---|
| $SiO_2$ | 71.9 | 71.7 | 71.3 | 70.6 |
| $Al_2O_3$ | 1.1 | 1.1 | 1.2 | 1.2 |
| CaO | 8.1 | 7.8 | 7.1 | 6.7 |
| MgO | 4.0 | 4.0 | 4.2 | 4.3 |
| $Na_2O$ | 14.3 | 13.3 | 11.3 | 9.4 |
| $K_2O$ | 0.2 | 1.7 | 4.6 | 7.4 |
| $Fe_2O_3$ | 0.038 | 0.034 | 0.031 | 0.030 |
| $K_2O/(Na_2O + K_2O)$ | 0.01 | 0.11 | 0.29 | 0.44 |

TABLE 2

| Wt % | EX 2.1.1 (comp) | EX 2.1.2 | EX 2.1.3 | EX 2.2.1 (comp) | EX 2.2.2 | EX 2.2.3 | EX 2.3.1 (comp) | EX 2.3.2 | EX 2.3.3 |
|---|---|---|---|---|---|---|---|---|---|
| $SiO_2$ | 71.8 | 71.6 | 70.9 | 72.0 | 71.7 | 71.0 | 73.0 | 72.7 | 71.4 |
| $Al_2O_3$ | 1.1 | 1.1 | 1.2 | 1.1 | 1.2 | 1.2 | 1.1 | 1.2 | 1.2 |
| CaO | 8.1 | 7.8 | 6.5 | 7.2 | 6.9 | 5.7 | 3.4 | 3.3 | 2.8 |
| MgO | 4.1 | 4.2 | 4.2 | 4.7 | 4.8 | 4.8 | 7.1 | 7.2 | 7.3 |
| $Na_2O$ | 14.3 | 13.3 | 9.3 | 14.4 | 13.4 | 9.4 | 14.8 | 13.7 | 9.6 |
| $K_2O$ | 0.2 | 1.7 | 7.6 | 0.2 | 1.7 | 7.6 | 0.2 | 1.7 | 7.6 |
| $Fe_2O_3$ | 0.034 | 0.003 | 0.027 | 0.035 | 0.032 | 0.028 | 0.034 | 0.033 | 0.028 |
| $K_2O/(Na_2O + K_2O)$ | 0.01 | 0.11 | 0.45 | 0.01 | 0.11 | 0.45 | 0.01 | 0.11 | 0.44 |

TABLE 3

| Wt % | EX3.1 (comp) | EX3.2 | EX3.3 |
|---|---|---|---|
| $SiO_2$ | 70.4 | 69.9 | 68.7 |
| $Al_2O_3$ | 3.1 | 3.1 | 3.2 |
| CaO | 7.3 | 6.9 | 5.9 |
| MgO | 4.8 | 4.7 | 4.8 |
| $Na_2O$ | 14.2 | 13.4 | 9.4 |
| $K_2O$ | 0.2 | 1.7 | 7.6 |
| $Fe_2O_3$ | 0.0 | 0.0 | 0.0 |
| $K_2O/(Na_2O + K_2O)$ | 0.01 | 0.11 | 0.45 |

TABLE 4

| Wt % | EX4.1 (comp) | EX4.2 | EX4.3 | EX4.4 (comp) | EX4.5 | EX4.6 |
|---|---|---|---|---|---|---|
| $SiO_2$ | 72.1 | 71.4 | 71.0 | 71.9 | 71.2 | 70.6 |
| $Na_2O$ | 14.2 | 11.2 | 9.3 | 14.3 | 11.2 | 9.3 |
| $K_2O$ | 0.1 | 4.8 | 7.9 | 0.1 | 4.8 | 7.9 |
| $Al_2O_3$ | 1.1 | 1.1 | 1.1 | 1.1 | 1.1 | 1.1 |
| CaO | 8.1 | 7.1 | 6.4 | 8.0 | 7.1 | 6.5 |

TABLE 4-continued

| Wt % | EX4.1 (comp) | EX4.2 | EX4.3 | EX4.4 (comp) | EX4.5 | EX4.6 |
|---|---|---|---|---|---|---|
| MgO | 4.2 | 4.2 | 4.2 | 4.1 | 4.2 | 4.2 |
| $Fe_2O_3$ | 0.21 | 0.19 | 0.18 | 0.48 | 0.45 | 0.42 |
| $K_2O/(Na_2O + K_2O)$ | 0.01 | 0.30 | 0.46 | 0.01 | 0.30 | 0.46 |

After the melting and the homogenization of the composition, the glass was cast in several small samples of 40*40 mm and annealed in an annealing furnace. Subsequently, the samples were polished up to a surface state similar to floated glass (mirror polishing). Several samples were produced for each composition, in order to allow to perform different tempering treatment for each composition.

Chemical Tempering

The samples prepared in above section were chemically tempered under two different tempering conditions, and for each of them the different samples were treated at the same time and in the same conditions. The samples of different compositions were placed in a cassette, preheated and then dippen in a molten $KNO_3$ (>99%) bath. After the ion exchange, the samples were cooled down and washed.

Two types of treatments were applied on the different glass compositions. The first one was carried out at 420° C. during an immersion time of 220 minutes (so called "low temperature"). The second one was carried out at 465° C. during 480 minutes (so called "high temperature"). Subsequently the surface compressive stress (CS) and the depth of exchanged layer (DoL) were measured via photoelasticimetry. The following tables 5-7 summarize the average value of CS and DoL for 3 random samples of each composition and each treatment.

TABLE 5

|  | EX1.1 (comp) | EX1.2 | EX1.3 | EX 1.4 |
|---|---|---|---|---|
| $CS_{465°\ C.}$ (MPa) | 501 | 523 | 481 | 427 |
| $DOL_{465°\ C.}$ (µm) | 21.4 | 25.4 | 31.6 | 37.9 |
| $CS_{420°\ C.}$ (MPa) | 747 | 706 | 588 | 495 |
| $DOL_{420°\ C.}$ (µm) | 8.6 | 9.7 | 13.0 | 16.1 |

TABLE 6

|  | EX 2.1.1 (comp) | EX 2.1.2 | EX 2.1.3 | EX 2.2.1 (comp) | EX 2.2.2 | EX 2.2.3 | EX 2.3.1 (comp) | EX 2.3.2 | EX 2.3.3 |
|---|---|---|---|---|---|---|---|---|---|
| $CS_{465°\ C.}$ (MPa) | 502 | 541 | 417 | 511 | 527 | 438 | 537 | 468 | 425 |
| $DOL_{465°\ C.}$ (µm) | 20.8 | 22.5 | 37.7 | 21.7 | 27.4 | 38.8 | 31.6 | 34.9 | 51.2 |
| $CS_{420°\ C.}$ (MPa) | 740 | 687 | 462 | 749 | 697 | 471 | 743 | 695 | 465 |
| $DOL_{420°\ C.}$ (µm) | 8.4 | 9.3 | 16.0 | 9.0 | 10.2 | 16.7 | 13.0 | 14.3 | 23.9 |

TABLE 6

|  | EX3.1 (comp) | EX3.2 | EX3.3 |
|---|---|---|---|
| $CS_{465°\ C.}$ (MPa) | 579 | 585 | 450 |
| $DOL_{465°\ C.}$ (µm) | 18.9 | 25.5 | 41.3 |
| $CS_{420°\ C.}$ (MPa) | 827 | 722 | 501 |
| $DOL_{420°\ C.}$ (µm) | 8.2 | 9.8 | 18.8 |

TABLE 7

|  | EX4.1 (comp) | EX4.2 | EX4.3 | EX4.4 (comp) | EX4.5 | EX4.6 |
|---|---|---|---|---|---|---|
| $CS_{465°\ C.}$ (MPa) | 516 | 512 | 476 | 517 | 526 | 489 |
| $DOL_{465°\ C.}$ (µm) | 22.1 | 29.6 | 38.6 | 21.9 | 29.6 | 36.4 |
| $CS_{420°\ C.}$ (MPa) | 811 | 671 | 525 | 809 | 662 | 533 |
| $DOL_{420°\ C.}$ (µm) | 7.9 | 10.6 | 14.7 | 7.7 | 10.6 | 14.5 |

Based on the measured values of the chemical tempering properties (CS and DoL), the ratio R between the high temperature and low temperature compressive stresses can be computed: $R=CS_{465°\ C.}/CS_{420°\ C.}$. This R ratio is an image of the surface compressive stress preservation at high temperature. A value of R close to 1 means that the glass tends to limit stress relaxation at high temperature, and that low and high temperature treatment finally yields the same level of compressive stress. On the other hand if the R ratio is small, it means that the glass submitted to a high temperature treatment tends to relax the generated stresses to a large extent.

The gain in DoL (G factor) can also be computed for each composition according to the invention by using the corresponding comparative sample: $G=(DoL_{sample}-DoL_{comparative})/DoL_{comparative}$. This G factor as to be as high as possible in order to improve the resistance of the glass pieces versus mechanical solicitations.

The R ratios and G factors for the different examples are summarized in the following tables 8-11.

TABLE 8

| | EX1.1 (comp) | EX1.2 | EX 1.3 | EX 1.4 |
|---|---|---|---|---|
| $K_2O/(Na_2O + K_2O)$ | 0.01 | 0.11 | 0.29 | 0.44 |
| R ($CS_{465° C.}/CS_{420° C.}$) | 0.67 | 0.74 | 0.82 | 0.86 |
| $G_{465° C.}$ (DoL improvement) | 0% | 19% | 48% | 77% |
| $G_{420° C.}$ (DoL improvement) | 0% | 13% | 51% | 86% |

TABLE 9

| | EX 2.1.1 (comp) | EX 2.1.2 | EX 2.1.3 | EX 2.2.1 (comp) | EX 2.2.2 | EX 2.2.3 | EX 2.3.1 (comp) | EX 2.3.2 | EX 2.3.3 |
|---|---|---|---|---|---|---|---|---|---|
| $K_2O/(Na_2O + K_2O)$ | 0.01 | 0.11 | 0.45 | 0.01 | 0.11 | 0.45 | 0.01 | 0.11 | 0.44 |
| R ($CS_{465° C.}/CS_{420° C.}$) | 0.68 | 0.79 | 0.90 | 0.68 | 0.76 | 0.93 | 0.72 | 0.67 | 0.91 |
| $G_{465° C.}$ (DoL improvement) | 0% | 8% | 81% | 0% | 26% | 79% | 0% | 10% | 62% |
| $G_{420° C.}$ (DoL improvement) | 0% | 10% | 90% | 0% | 13% | 86% | 0% | 10% | 84% |

TABLE 10

| | EX3.1 (comp) | EX3.2 | EX3.3 |
|---|---|---|---|
| $K_2O/(Na_2O + K_2O)$ | 0.01 | 0.11 | 0.45 |
| R ($CS_{465° C.}/CS_{420° C.}$) | 0.70 | 0.81 | 0.90 |
| $G_{465° C.}$ (DoL improvement) | 0% | 35% | 118% |
| $G_{420° C.}$ (DoL improvement) | 0% | 19% | 128% |

TABLE 11

| | EX4.1 (comp) | EX4.2 | EX4.3 | EX4.4 (comp) | EX4.5 | EX4.6 |
|---|---|---|---|---|---|---|
| $K_2O/(Na_2O + K_2O)$ | 0.01 | 0.30 | 0.46 | 0.01 | 0.30 | 0.46 |
| R ($CS_{465° C.}/CS_{420° C.}$) | 0.64 | 0.76 | 0.91 | 0.64 | 0.79 | 0.92 |
| $G_{465° C.}$ (DoL improvement) | 0% | 34% | 86% | 0% | 37% | 87% |
| $G_{420° C.}$ (DoL improvement) | 0% | 34% | 75% | 0% | 35% | 66% |

From the above tables 8-11, the beneficial effect of the composition of the invention is highlighted: by increasing the $K_2O/(K_2O+Na_2O)$ ratio while keeping the rest of the composition stable on a molar point of view, the G factors (420° C. and 465° C.) of the composition increases significantly, meaning that the composition according to the invention allows faster ion exchange at the two tested temperatures. Moreover, this surprising effect is also observed and similar for the different glass tints, i.e. for the two different iron levels in series of samples 4.x (Table 11).

Similarly, the R ratio increases with higher values of $K_2O/(K_2O+Na_2O)$, highlighting the effect of stress conservation for high temperature treatment. In this set of experiments, the comparative examples present a R ratio around 0.65-0.7, meaning that increasing the treatment temperature from 420° C. to 465° C. will reduce the surface compressive stress by 30-35%. On the other side, examples according to the invention present a R ratio up to 0.92, meaning that the higher temperature treatment only reduces the compressive stress by 10% or less with respect to low temperature treatment.

By this way, interesting combinations of DoL (up to 50 μm) and CS (kept higher than 400 MPa) can be obtain with the composition according to the invention, by applying higher temperature treatments.

Warping Behaviour

Figure 2:
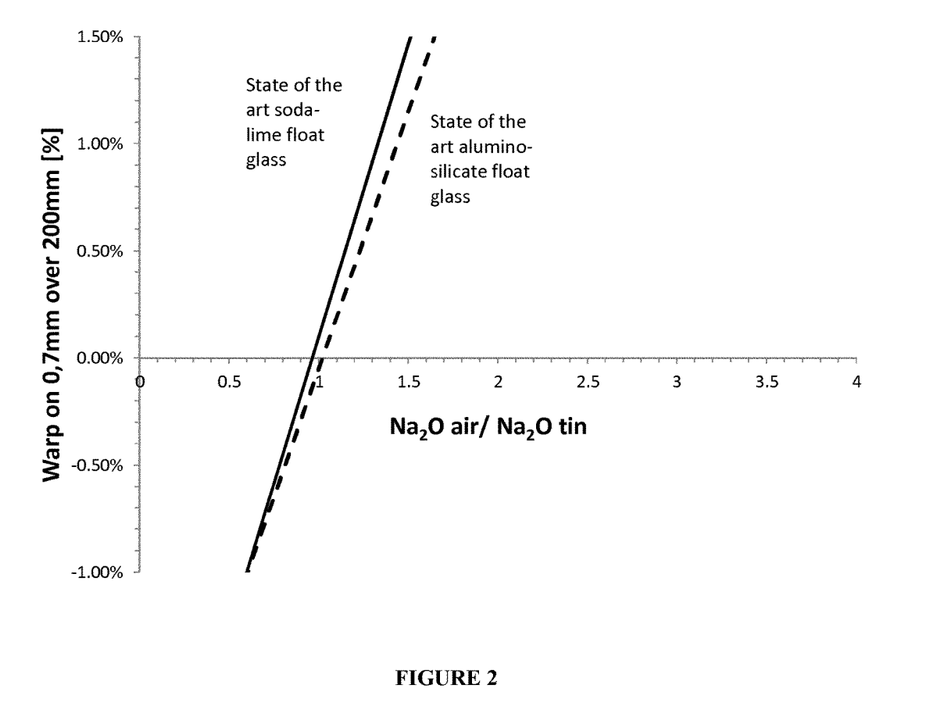
FIG. 2 shows evolution of warp vs. $Na_2O_{air}/Na_2O_{tin}$ ratio on a glass sample.

FIG. 2 shows evolution of warp (on 0.7 mm thickness sheet and for 200 mm sample length) vs. $Na_2O_{air}/Na_2O_{tin}$ ratio for (i) classical soda-lime float glass from the state-of-the-art (plain line) and (ii) classical alumino-silicate float glass from the state-of-the-art (in particular, a DragonTrail glass from Asahi Glass Co.) (dashed line). In view of this figure, the behaviour from the composition of the invention will be intermediate between both shown trendlines.

Other Properties

The following properties were evaluated for the series of examples 4.x on the basis of glass composition using Fluegel model (*Glass Technol.: Europ. J. Glass Sci. Technol.* A 48 (1): 13-30 (2007); and *Journal of the American Ceramic Society* 90 (8): 2622 (2007)):

Glass melt density evaluated at 1200 and 1400° C.;
Viscosity through the "Melting point temperature T2";
"Working point temperature T4";
Devitrification temperature T0;
Table 12 summarizes obtained results.
In a general manner:
The melting point temperature T2 is preferably at most 1550° C., more preferably at most 1520° C., the most preferably at most 1500° C.
The Working point temperature T4 is preferably at most 1130° C., more preferably at most 1100° C., the most preferably at most 1070° C.
The devitrification temperature T0 is preferably at most T4, more preferably at most T4-20° C., the most preferably at most T4-40° C.

The compositions according to present invention are suitable for forming by a float process and while using existing furnace tools for production of soda lime glass because of:
- their melting point temperature T2 being lower than 1500° C. and which are close to the one of classical soda lime glass (Comparative ex.1.1 and 2.1).
- their working point temperature T4 which is lower than 1100° C. and which are close to a classical soda lime glass (Comparative ex.1.1 and 2.1).
- their devitrification temperature T0 are suitable because lower than working point temperature T4;
- their glass density which is very close to soda lime glasses (Comparative EX4.1 and 4.4), thereby avoiding/limiting density defects during composition change (transition).

TABLE 12

|  | EX4.1 (comp) | EX4.2 | EX4.3 | EX4.4 (comp) | EX4.5 | EX4.6 |
|---|---|---|---|---|---|---|
| Glass melt density (1200° C.) | 2.37 | 2.35 | 2.34 | 2.36 | 2.35 | 2.34 |
| Glass melt density (1400° C.) | 2.33 | 2.32 | 2.31 | 2.33 | 2.32 | 2.32 |
| Melting point T2 (° C.) | 1450 | 1480 | 1500 | 1449 | 1479 | 1498 |
| Working point T4 (° C.) | 1028 | 1041 | 1049 | 1027 | 1040 | 1047 |
| Devitrification temperature T0 (° C.) | 993 | 988 | 975 | 989 | 988 | 980 |

Finally, compositions according to the invention allow to get sulfate fining ability during their manufacture/melting, thanks to an adequate solubility of sulfate and suitable high-temperature viscosity.

The invention claimed is:

1. A float glass sheet comprising the following in weight percentage, expressed with respect to the total weight of glass:

$65 \leq SiO_2 \leq 78\%$;
$5 \leq Na_2O \leq 20\%$;
$1 \leq K_2O < 8\%$;
$1 \leq Al_2O_3 < 6\%$;
$2 \leq CaO < 10\%$;
$0 \leq MgO \leq 8\%$; and
$K_2O/(K_2O+Na_2O)$ ratio of from 0.1 to 0.7,
wherein the glass sheet has:

$$0.01 < \left| \frac{(Na_2O)_{air}}{(Na_2O)_{tin}} - 1.03 \right| \leq 3,$$

and
wherein the glass sheet is boron- and lithium-free.

2. A float glass sheet according to claim 1, wherein the composition comprises total iron (expressed in the form of $Fe_2O_3$) in a content ranging from 0.002 to 1.7% by weight.

3. A float glass sheet according to claim 2, wherein the composition comprises total iron (expressed in the form of $Fe_2O_3$) in a content ranging from 0.002 to 0.06% by weight.

4. A float glass sheet according to claim 3, wherein the composition comprises total iron (expressed in the form of $Fe_2O_3$) in a content ranging from 0.002 to 0.02% by weight.

5. A float glass sheet according to claim 1, wherein the composition comprises an alumina content such that $1 \leq Al_2O_3 \leq 4$ wt %.

6. A float glass sheet according to claim 5, wherein the composition comprises an alumina content such that : $2 \leq Al_2O_3 \leq 3$ wt %.

7. A float glass sheet according to claim 1, wherein the composition comprises : $5 \leq CaO < 10$ wt %.

8. A float glass sheet according to claim 1, wherein the composition comprises : $1 \leq K_2O < 6$ wt %.

9. A float glass sheet according to claim 1, wherein the composition comprises a $K_2O/(K_2O+Na_2O)$ ratio of from 0.1 to 0.5.

10. A float glass sheet according to claim 1, wherein the composition comprises a $K_2O/(K_2O+Na_2O)$ ratio of from 0.2 to 0.5.

11. A float glass sheet according to claim 1 wherein the composition comprises a $K_2O/(K_2O+Na_2O)$ ratio of from 0.2 to 0.4.

12. A float glass sheet according to claim 1, wherein the glass sheet has:

$$\frac{(Na_2O)_{air}}{(Na_2O)_{tin}} \leq 1.$$

13. A float glass sheet according to claim 1, wherein R ($CS_{465° C.}/CS_{420° C.}$) is from 0.76 to 0.92.

14. A float glass sheet according to claim 1, wherein the glass sheet has a thickness of less than 1.5 mm.

15. A float glass sheet according to claim 1, wherein the glass sheet has a thickness of less than 0.7 mm.

16. A float glass sheet according to claim 1, wherein the float glass sheet is chemically tempered.

17. An electronic device comprising the float glass sheet according to claim 16.

18. An electronic device comprising the float glass sheet according to claim 1.

19. A float glass sheet comprising the following in weight percentage, expressed with respect to the total weight of glass:

$65 \leq SiO_2 \leq 78\%$;
$5 \leq Na_2O \leq 20\%$;
$1 \leq K_2O < 8\%$;
$3 \leq Al_2O_3 < 6\%$;
$2 \leq CaO < 10\%$;
$0 \leq MgO \leq 8\%$; and
$K_2O/(K_2O+Na_2O)$ ratio of from 0.1 to 0.7,
wherein the glass sheet has:

$$0.02 < \left| \frac{(Na_2O)_{air}}{(Na_2O)_{tin}} - 1.03 \right| \leq 3,$$

and
wherein the glass sheet is boron- and lithium-free.

* * * * *